(12) United States Patent
Buta

(10) Patent No.: US 12,540,045 B2
(45) Date of Patent: Feb. 3, 2026

(54) BUNDLE BUILDER AND LIFTER

(71) Applicant: Butech, Inc., Salem, OH (US)

(72) Inventor: John R. Buta, Salem, OH (US)

(73) Assignee: BUTECH, INC., Salem, OH (US)

( * ) Notice: Subject to any disclaimer, the term of this patent is extended or adjusted under 35 U.S.C. 154(b) by 0 days.

(21) Appl. No.: 18/798,258

(22) Filed: Aug. 8, 2024

(65) Prior Publication Data

US 2025/0051109 A1 Feb. 13, 2025

Related U.S. Application Data

(60) Provisional application No. 63/531,427, filed on Aug. 8, 2023.

(51) Int. Cl.
*B65G 57/30* (2006.01)
*B65G 47/28* (2006.01)

(52) U.S. Cl.
CPC ........... *B65G 57/302* (2013.01); *B65G 47/28* (2013.01); *B65G 2814/0304* (2013.01)

(58) Field of Classification Search
CPC ................ B65G 57/302; B65G 57/301; B65G 2814/0304; B65G 57/24; B65G 47/90; B65G 47/901; B65H 2301/42122; B65H 29/34; B65H 29/38
USPC ......... 414/746.6, 746.1, 746.2, 745.9, 791.6, 414/792.6, 792.8, 794.9; 198/468.6, 198/463.5
See application file for complete search history.

(56) References Cited

U.S. PATENT DOCUMENTS

| | | | | |
|---|---|---|---|---|
| 2,251,197 A | * | 7/1941 | Nestmann | A23G 7/0037 198/801 |
| 2,949,118 A | * | 8/1960 | Long | A24B 5/04 414/795.3 |
| 4,010,843 A | * | 3/1977 | Lucas | B65G 47/54 198/468.1 |
| 4,245,940 A | * | 1/1981 | Luther | H05K 13/0061 271/212 |
| 5,238,100 A | * | 8/1993 | Rose, Jr. | B65G 47/53 198/468.6 |
| 5,372,239 A | * | 12/1994 | Ueda | H01L 21/67721 198/457.03 |
| 6,722,844 B2 | * | 4/2004 | Lunden | B65G 57/245 414/789.5 |
| 8,052,371 B2 | * | 11/2011 | Setozaki | B65H 29/6609 198/418.9 |

FOREIGN PATENT DOCUMENTS

| | | | | |
|---|---|---|---|---|
| DE | 3100003 A1 | * | 3/1982 | ........... B65G 57/302 |
| KR | 20210135884 A | * | 11/2021 | ............. B65G 13/02 |

* cited by examiner

*Primary Examiner* — Gregory W Adams
(74) *Attorney, Agent, or Firm* — Lippes Mathias LLP

(57) ABSTRACT

A bundle builder and lifter assembly has a pair of parallel cross beams, and an actuator assembly for actuating the builder and lifter assembly. A pair of lift arms are moved along the parallel cross beams and each has a vertical portion and a horizontal portion forming a finger. The lift arms are also raised and lowered. A conveyor roller assembly is positioned above the lift arms and cross beams, where stacks of material are moved on the rollers of the conveyor assembly. The stacks of material are placed in a stack by the lift arms forming a bundle, which is then removed from the conveyor roller assembly.

14 Claims, 22 Drawing Sheets

BUNDLE BUILDER AND LIFTER

CLAIM OF PRIORITY

This application claims priority to Provisional Patent Application Ser. No. 63/531,427 filed on Aug. 8, 2023, the entirety of such is hereby incorporated by reference.

BACKGROUND OF THE DISCLOSURE

The disclosure relates to bundle builders and lifters. More particularly, it relates to a system which creates and builds bundles of material while also lifting and moving the bundles once assembled.

Metal sheets are cut during processing and the length of sheet that is supported in the stacking device is stacked with previously cut strips called "stacks" or "packs". Spacers, which are referred to as "dunnage", are often used to separate the sheet packs when stacked on top of each other, which can collectively be referred to as a "bundle".

Building the bundles at the sheet stacker, which requires the introduction of the dunnage in that location, is cumbersome, relatively unsafe (because an operator is reaching inside a machine) and slows the process down. The stacks still need to be packaged (i.e., banded and in some cases wrapped) prior to shipping. Traditionally this is a manual process and may require the bundles to be unstacked in order to be packaged. In order to automate the packaging process, individual packs are discharged from the Cut-To-Length (CTL) Line. The consequence of this is that if the packs were not stacked into bundles the crane would have to handle every single pack and wouldn't be able to keep up.

To solve this problem, two individual pieces of equipment have been provided for this process—1) a bundle builder which receives packs and stacks them into bundles and the discharges them and 2) a bundle lifter which raises the bundles so they can be picked up by a sheet lifter suspended from the overhead crane. The disadvantage of two discrete machines is that it takes double the floor space. When there is not enough space available for both machines there is a need to combine them into a single unit.

Thus, it is desired to provide a bundle builder and lifter which overcomes the above-mentioned deficiencies and others while providing better and more advantageous overall results, such as improving the overall productivity, efficiency, and safety of the process.

SUMMARY OF THE DISCLOSURE

The present disclosure is related to bundle building systems. More particularly, it relates to an automated system that creates bundles of material such as metal pieces with spacers between the sheets or pieces and raises the completed bundle to facilitate removal by a standard sheet lifter.

In particular, the present disclosure provides a system that includes a roller conveyer system which moves packs of metal pieces towards lifting arms on opposite sides of the conveyer system. The lifting arms raises the packs of the metal pieces, then a spacer (or dunnage) on top of another pack of material is moved along the conveyer until positioned underneath the first pack of metal pieces, then, the lift arms lower the first pack and place it on top of the dunnage of the second pack, then, the lift arms open, lower, close and raise the second pack with spacers and the first pack on top of the second pack so a third metal sheet pack (with spacers) can be rolled underneath the previous two packs. Once the desired bundle or stack of material is created, the same lifting arms then move to a raising position and lifts the entire bundle so it can be removed using a standard sheet lifter suspended from an overhead crane or similar. This process can be repeated for additional bundles. Each bundle can have various combinations of pack length and spacers.

During operation, a stack of sheets or pieces of metal are placed on a conveyor, then the metal piece stack is raised, and a spacer or dunnage (mounted on another stack) is placed underneath the sheet stack, then another sheet stack is added, etc. The dunnage pieces and the sheet stacks are then lifted by a lifting arm and mechanism, which is part of the stacker assembly, and are lowered and placed in a desired location away from the conveyor for further processing.

Automation is often used for the movement of the pieces and spacers, instead of moving them by hand, which results in an increase in time and cost efficiency. Then to increase efficiency, reduce costs and manual labor, there is a need for a bundle builder which not only creates and builds a bundle of material but also provides a lifting mechanism for lifting the bundle of material and the spacers and moves them away from the bundle builder to a separate designated area.

The layout of the present disclosure uses AC motors and screw jacks for actuation. In future designs there could also be hydraulic cylinders, rack and pinions or maybe some other type of linear actuator.

In accordance with a preferred embodiment of the disclosure, a bundle builder and lifter assembly has a pair of parallel cross beams; actuator assemblies for actuating the builder and lifter assembly; a pair of lift arms which are moved along the parallel cross beams; the lift arms each has a vertical portion and a horizontal portion forming a finger; a conveyor roller assembly is positioned above the lift arms and cross beams; wherein a stack of material is moved on the rollers of the conveyor assembly.

In accordance with another aspect of the disclosure, a bundle builder and lifter assembly has a conveyor assembly having a plurality of rollers; a pair of horizontal support members having a plurality of lift arms; an actuator for moving, raising and lowering the lift arms; the lift arms have fingers which engage and raise and lower stacks of material which are positioned on rollers of said conveyor, and the stacks of material form a bundle, and a lift mechanism raises the bundle off of the conveyor assembly.

In accordance with another aspect of the disclosure, an automatic system and method is provided for creating bundles or stacks, thereby avoiding or minimizing the need for a packer to manually create bundles and freeing the packer for other tasks.

In accordance with another aspect of the disclosure, a method for forming and lifting a bundle assembly comprising: providing a pair of cross beams; providing a pair of support beams extending between the cross beams; providing a plurality of lift arms positioned along a length of each of the support beams; providing a actuator for raising and lowering the cross beams and moving the support beams and lift arms along a length of said cross beams; providing a conveyor assembly having rollers; placing and moving a first stack of material on the rollers; moving the lift arms below said first stack and then raising said first stack off of said conveyor via the lift arms; moving a second stack of material on the rollers to a position below the first stack; lowering the first stack onto the second stack, moving the lift arms out of engagement with the first stack thereby forming a bundle and using a lift mechanism to lift and remove the bundle off of the conveyor.

Another aspect of this disclosure is to automatically insert spacers or dunnage thereby improving the overall productivity and safety of the process and reducing downtime of stopping and starting the process of inserting spacers or dunnage.

Another aspect of the disclosure is a stacker assembly which also has a lifting mechanism to move the packs off of the stacker assembly.

Other aspects of the disclosure will become apparent upon a reading and understanding of the following detailed description.

DETAILED DESCRIPTION OF THE DISCLOSURE

Figure 1:
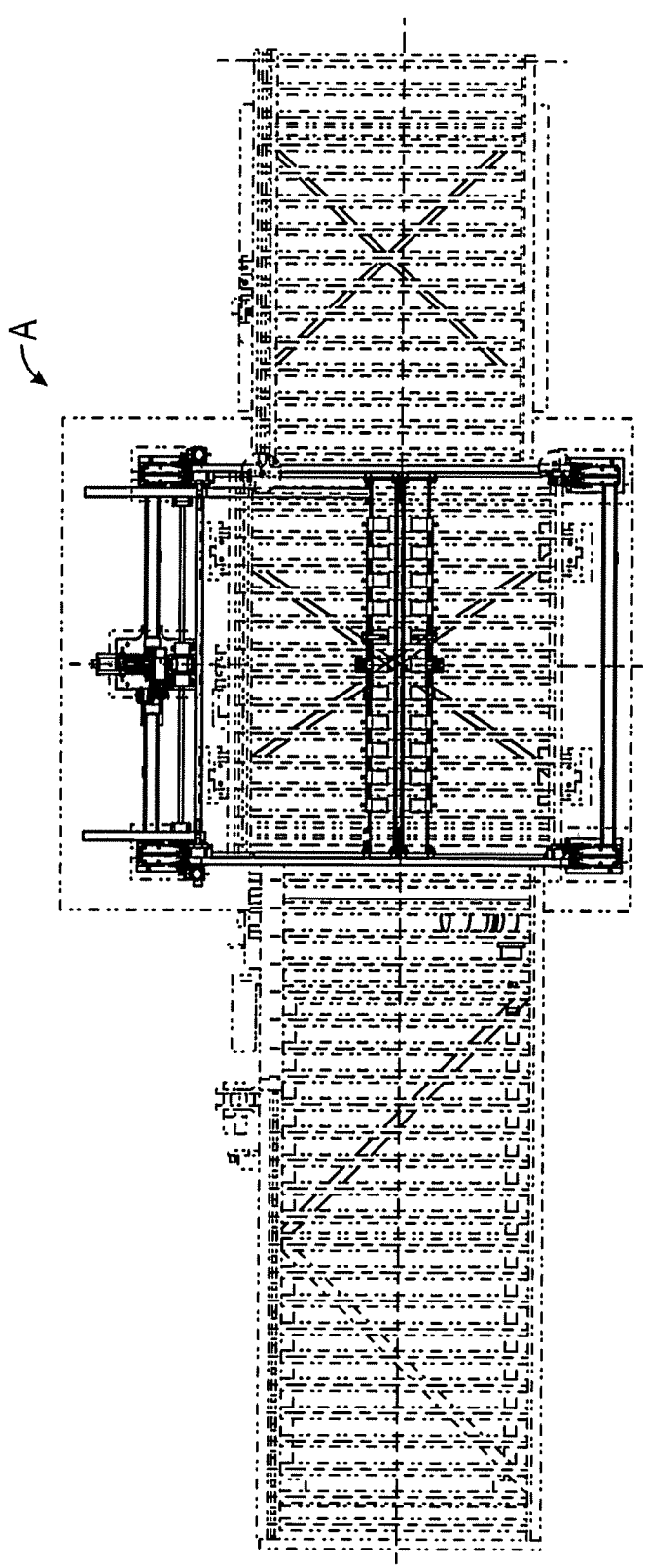
FIG. 1 is a top plan view of the bundle builder arrangement in accordance with a preferred embodiment of the disclosure.

With reference now to FIGS. 1-23, an automated bundle building/bundle lifting system in accordance with a preferred embodiment of the disclosure is shown and described. Referring to FIG. 1, a bundle builder/lifter general arrangement A is shown.

Figure 2:
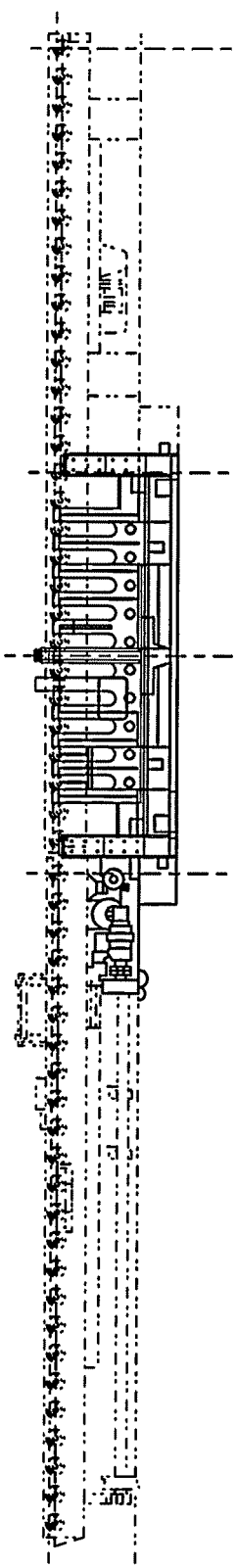
FIG. 2 is a side elevational view of the bundle builder of FIG. 1. illustrating the bundle builder arrangement in the direction of travel.
Figure 3:
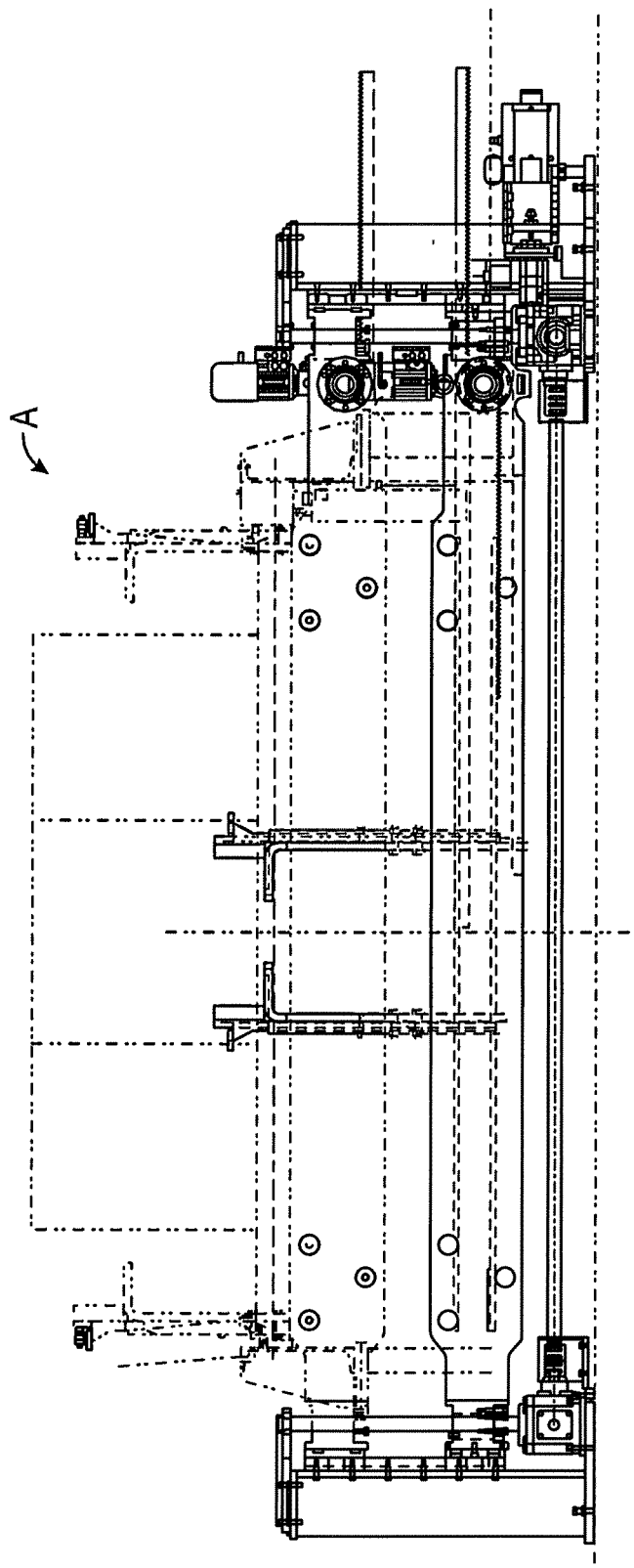
FIG. 3 is another side elevational view of the bundle builder in the direction of travel.

FIGS. 2 and 3 are side elevational views of the arrangement A looking in the direction of travel.

Figure 4:
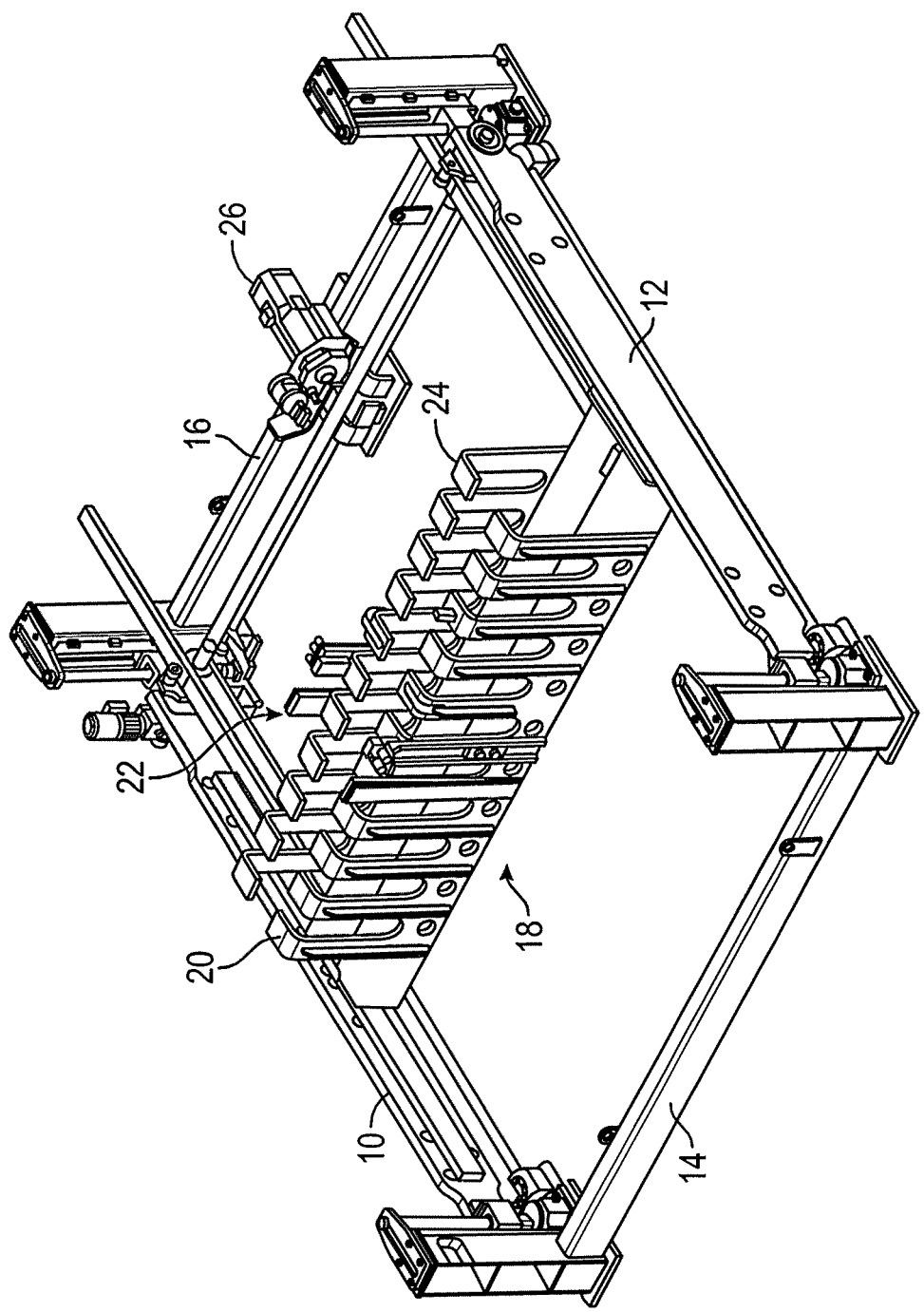
FIG. 4 is a perspective view of the bundle lift arm arrangement.
Figure 5:
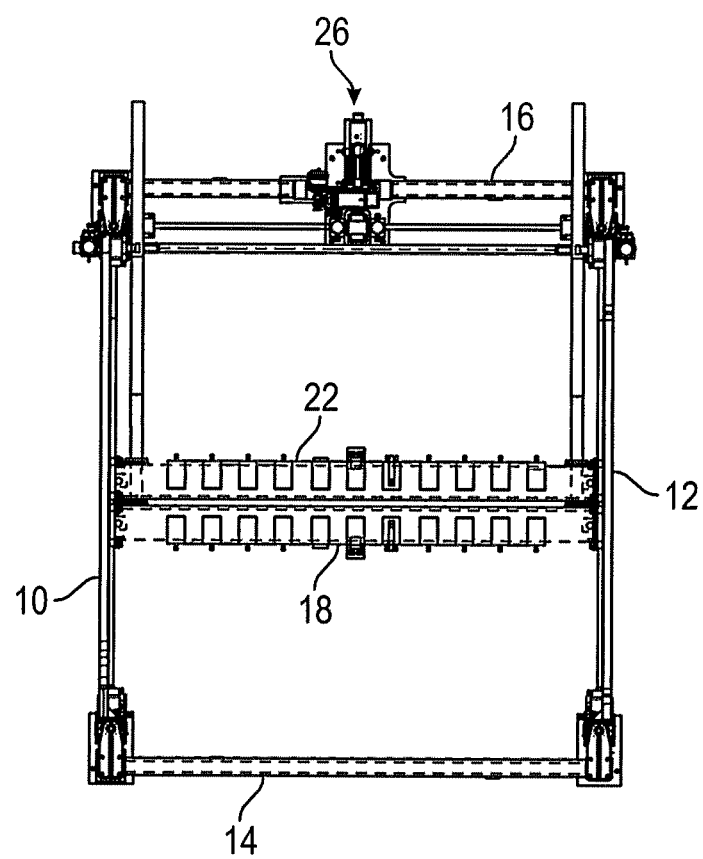
FIG. 5 is a top plan view of the bundle lift arm arrangement.

FIG. 4 illustrates a perspective view of the bundle lift arm arrangement showing longitudinal and parallel cross beams 10, 12, operator side and drive side beams 14, 16, (which are perpendicularly positioned relative to cross beams 10,12) and an operator side lift arm assembly 18 with multiple lift fingers 20, and a drive side lift arm assembly 22 with multiple lift fingers 24. Lift arm assembly 18 is mounted to a movable support cross beam 19, while lift arm assembly 22 is mounted to movable support cross beam 21. Cross beams 19 and 21 are mounted perpendicular to cross beams 10,12 and move along the longitudinal axes of beams 10,12. In turn, lift arms 18, 22 also move along a longitudinal axes of support beams 10,12. The drive side beam 16 includes an actuator assembly 26. (FIG. 5). The actuator assembly 26 preferably includes AC motors and screw jacks to actuate the lift arm assemblies 18,22 and raises and lowers cross beams 10,12 (and the lift arms 18,22) and moves support beams 19,21 along a longitudinal axis of beams 10,12 and also moves the lift arms 18,22 along the length of beams 10, 12. Alternately, hydraulic cylinders, rack and pinions or other linear actuators can be used.

Figure 6A:
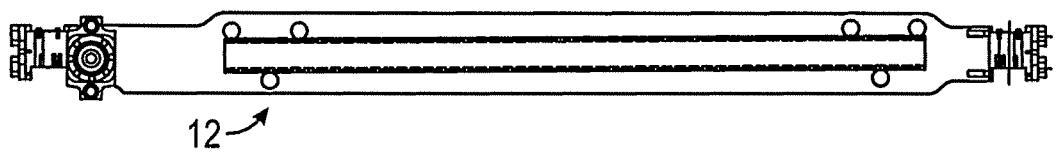
FIG. 6A is a side elevational view of the drive side jack and motor assembly.
Figure 6B:
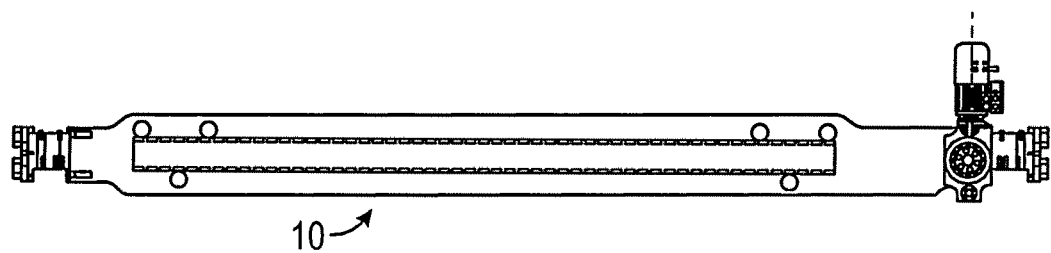
FIG. 6B is a side elevational view of the drive side jack and motor assembly.

FIGS. 6A and 6B illustrate detailed side elevational views of the rear cross beam assembly 12 and the front cross beam assembly 10.

Figure 7B:
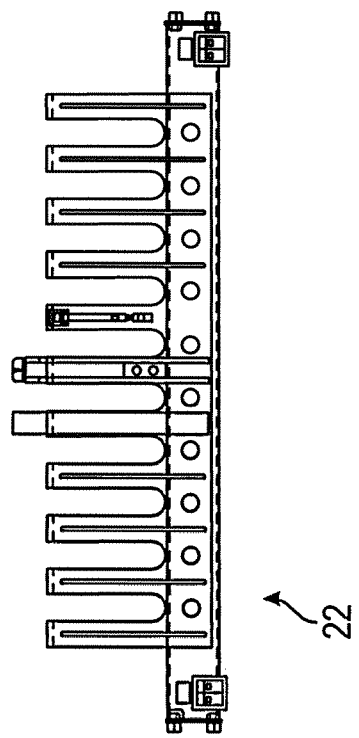
FIG. 7B is a side elevational view of the drive side lift arm.
Figure 7A:
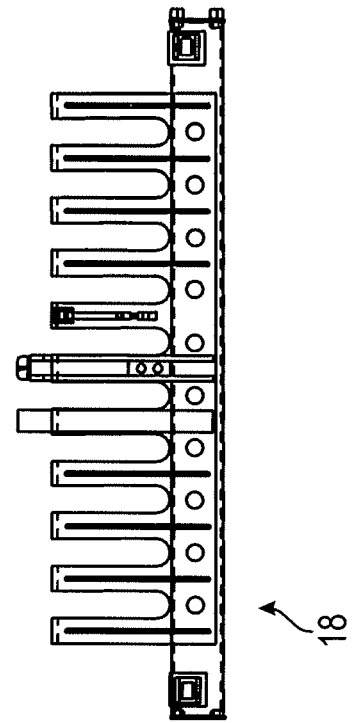
FIG. 7A is a side elevational view of the operation side lift arm.

FIGS. 7A and 7B illustrate additional views of the stacker and lift arm assemblies 18, 22 and the mechanism to raise and lower and move the lift arms.

Figure 8:
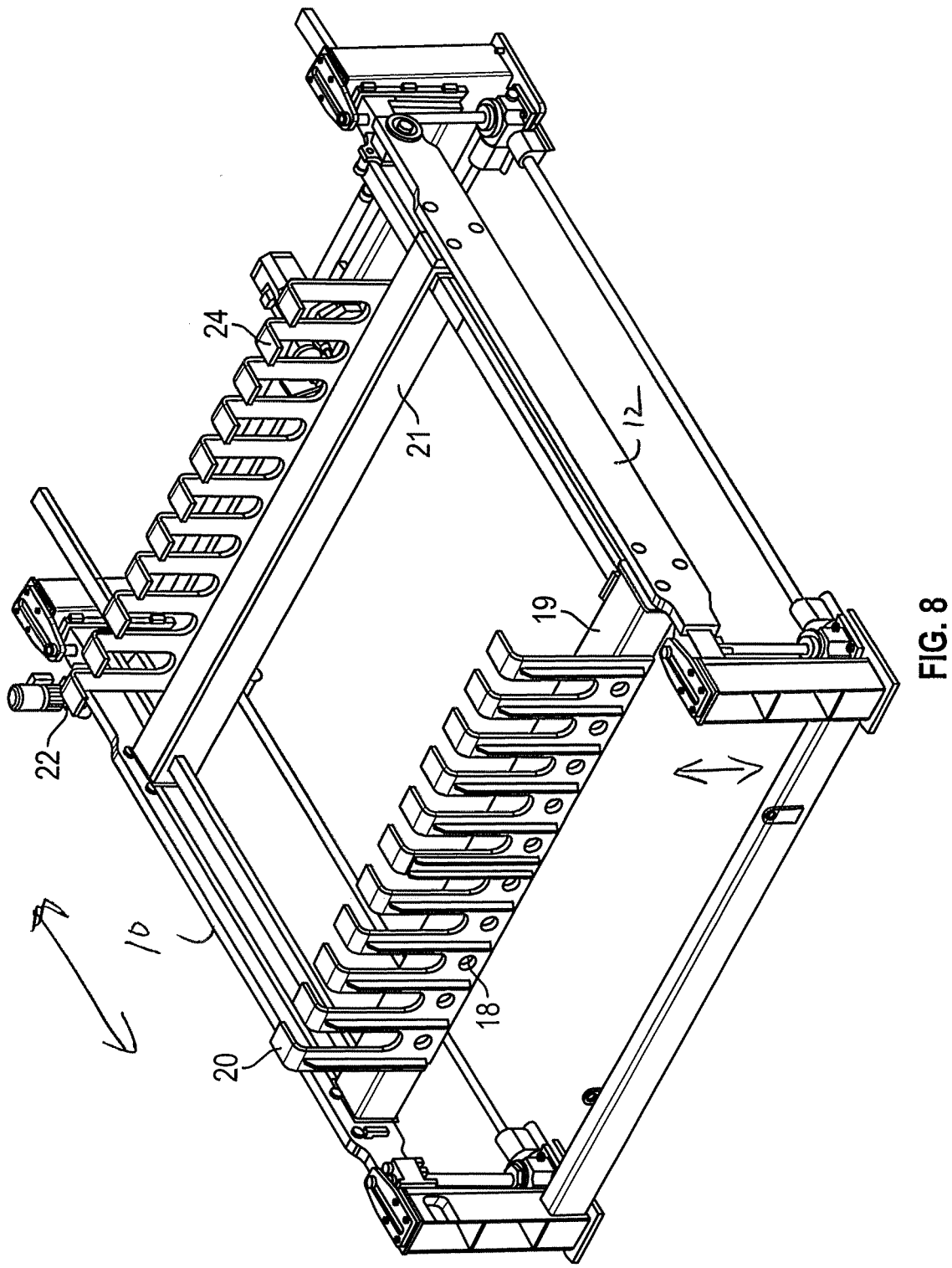
FIG. 8 is a perspective view showing the lift arm assemblies positioned on opposite sides of the bundle builder assembly.

FIG. 8 is a perspective view illustrating the lift arm assemblies 18, 22 in a raised and outwardly positioned arrangement. Lift arms 18,22 have horizontally extending lift fingers 20,24 formed at outer edges of the arms.

Figure 9:
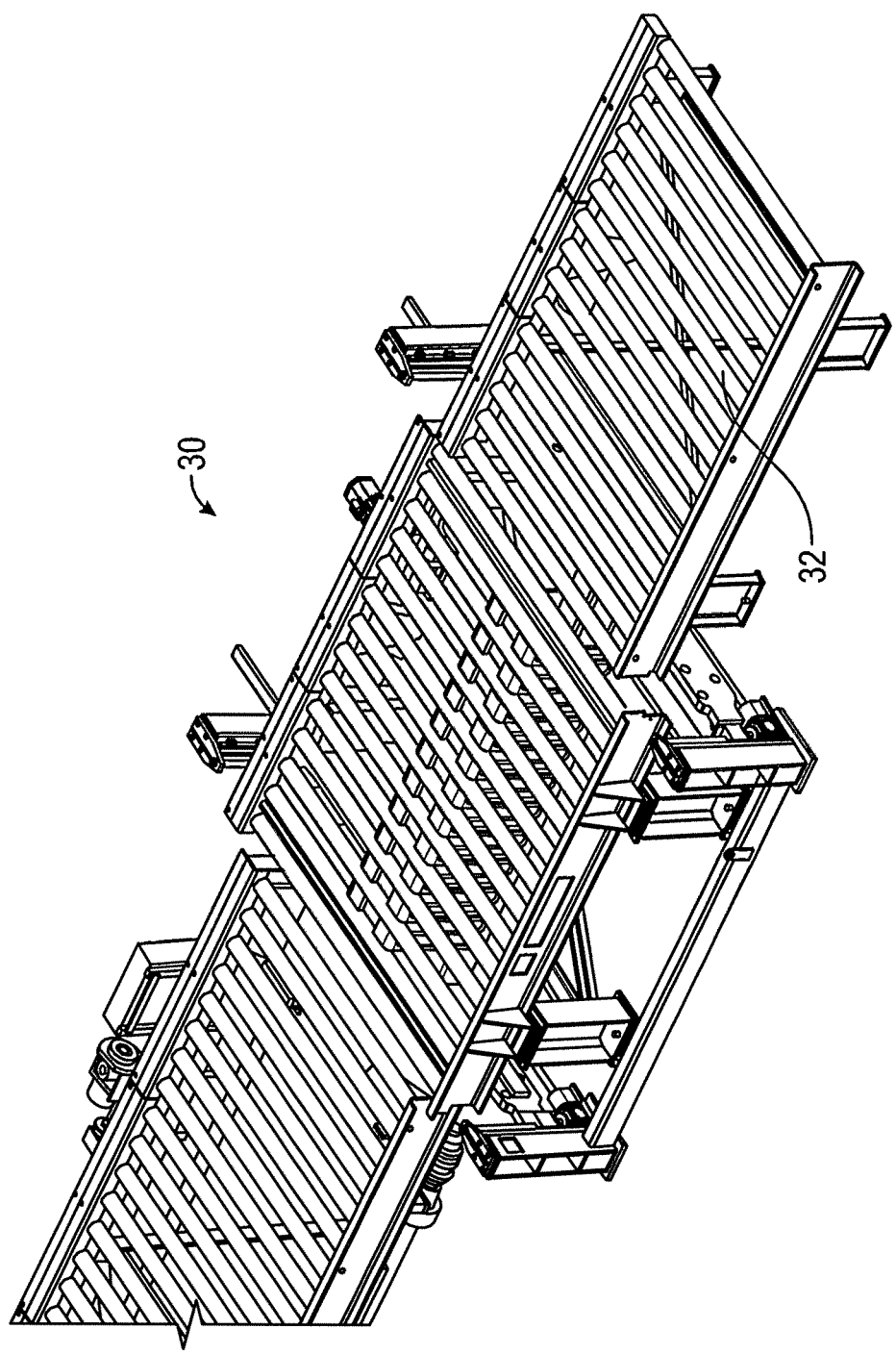
FIG. 9 is a perspective view of the conveyor roller assembly and the bundle builder assembly.
Figure 10:
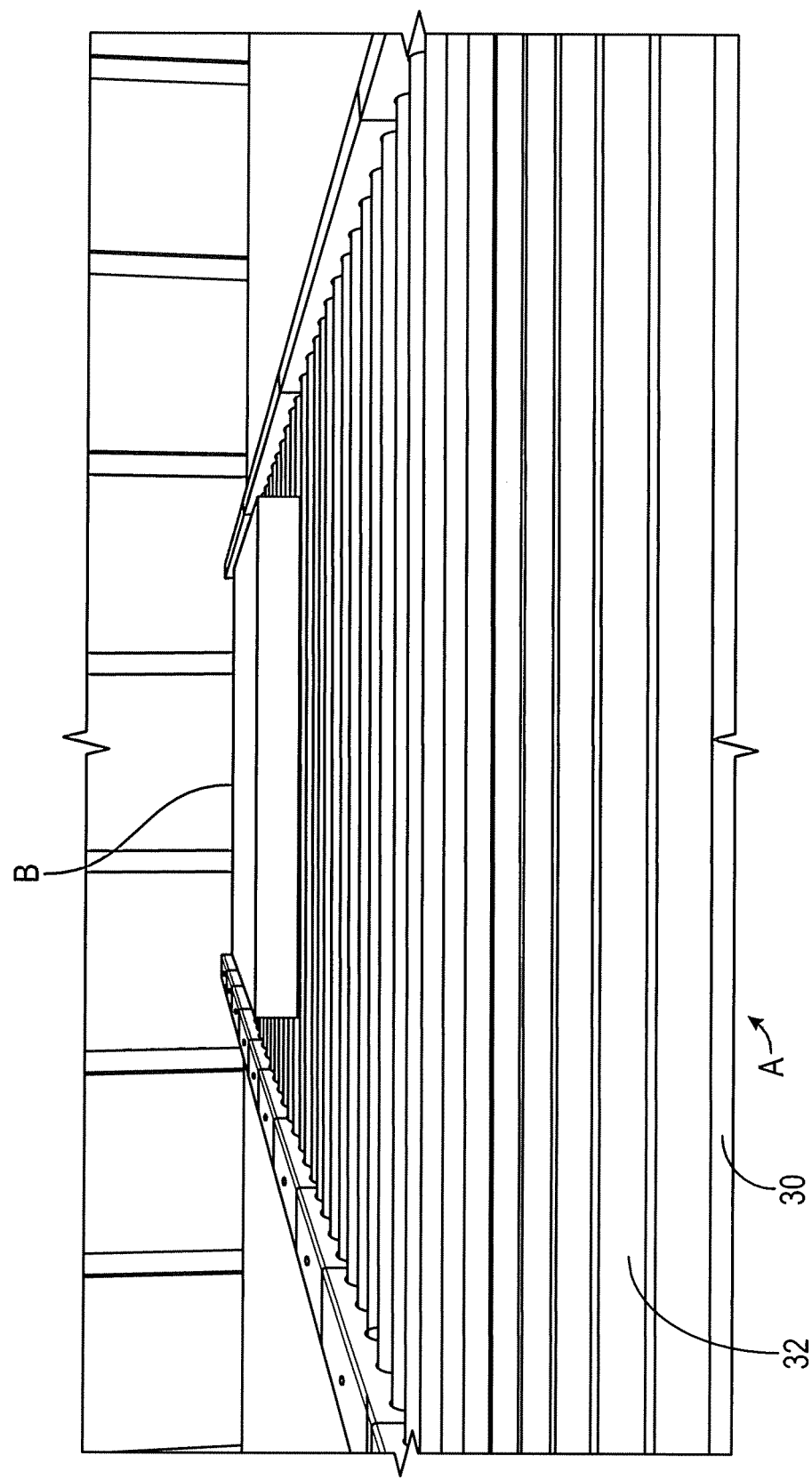
FIG. 10 is a front elevational view of the conveyor roller assembly, with stack B on the rollers.

FIGS. 9 and 10 are perspective views of a conveyor system 30 using a series of parallel rollers 32 which form a track for a pack B to travel on.

Referring now to FIGS. 10-23, the process of building bundles and lifting them from the stacker arrangement will be discussed.

Refer to FIG. 10, a stack or pack B of metal sheets, pieces, or other material is placed on the rollers 32 of conveyer 30 of the stacker assembly A. The pack B is rolled along the conveyor and lined up with the opposing lift arms 18, 22 (FIG. 11) which are initially below the conveyor, and arms 18,22 (and beams 19,21) are then moved underneath the pack B (along beams 10,12) and then are vertically raised via actuator assembly 26 (and via beams 10,12 which are raised) and positioned underneath stack B on the conveyer. Each lift arm 18,22 has a substantial L-shape including a vertical member 33,35 perpendicular to horizontal members or fingers 20,24 to create the vertical spacing for the dunnage or spacers and another stack of material and the horizontal members 20,24 hold each end of stack B while in the raised position.

Figure 11:
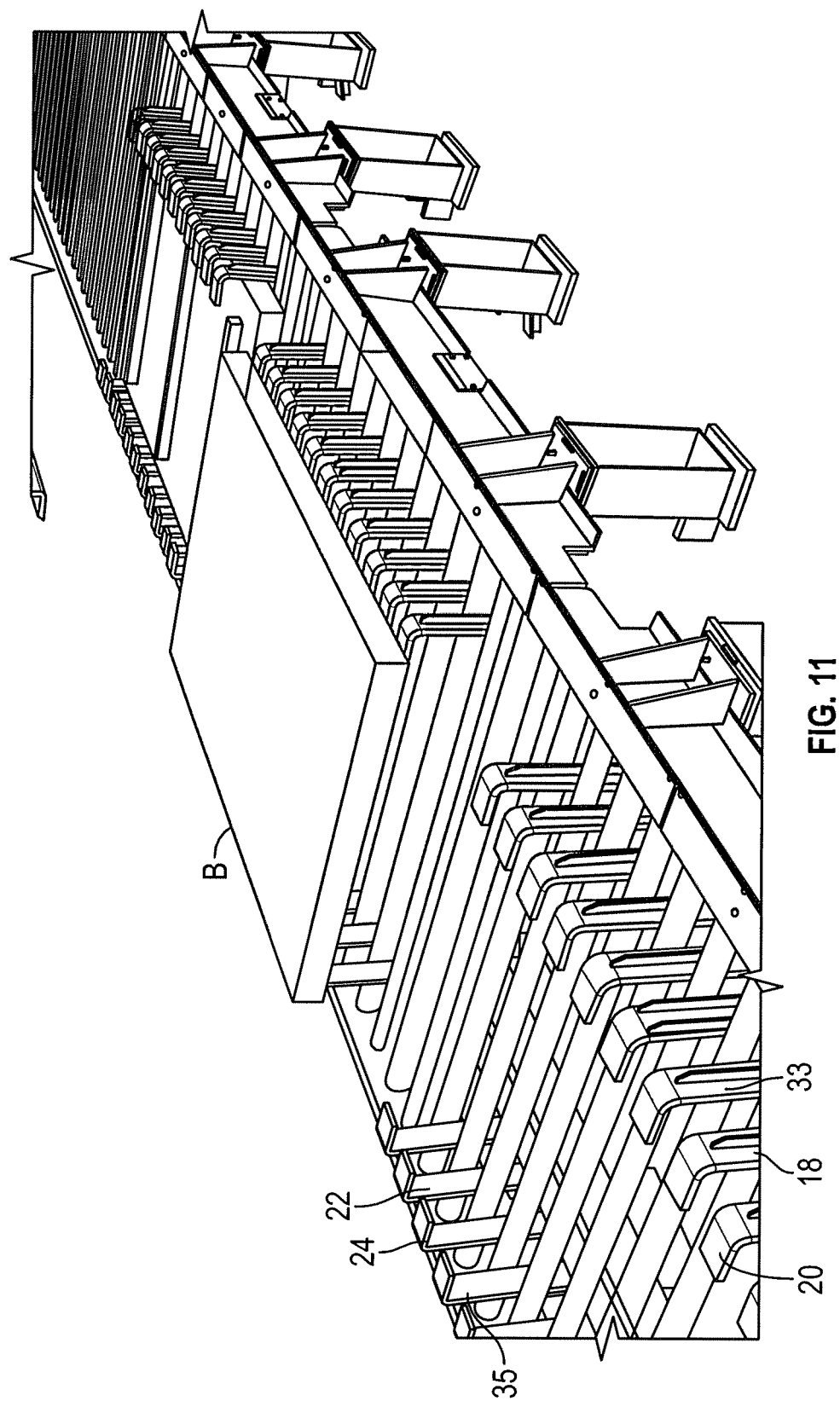
FIG. 11 is a side elevational view of the conveyor rollers with the lift arm holding the stack.
Figure 12:
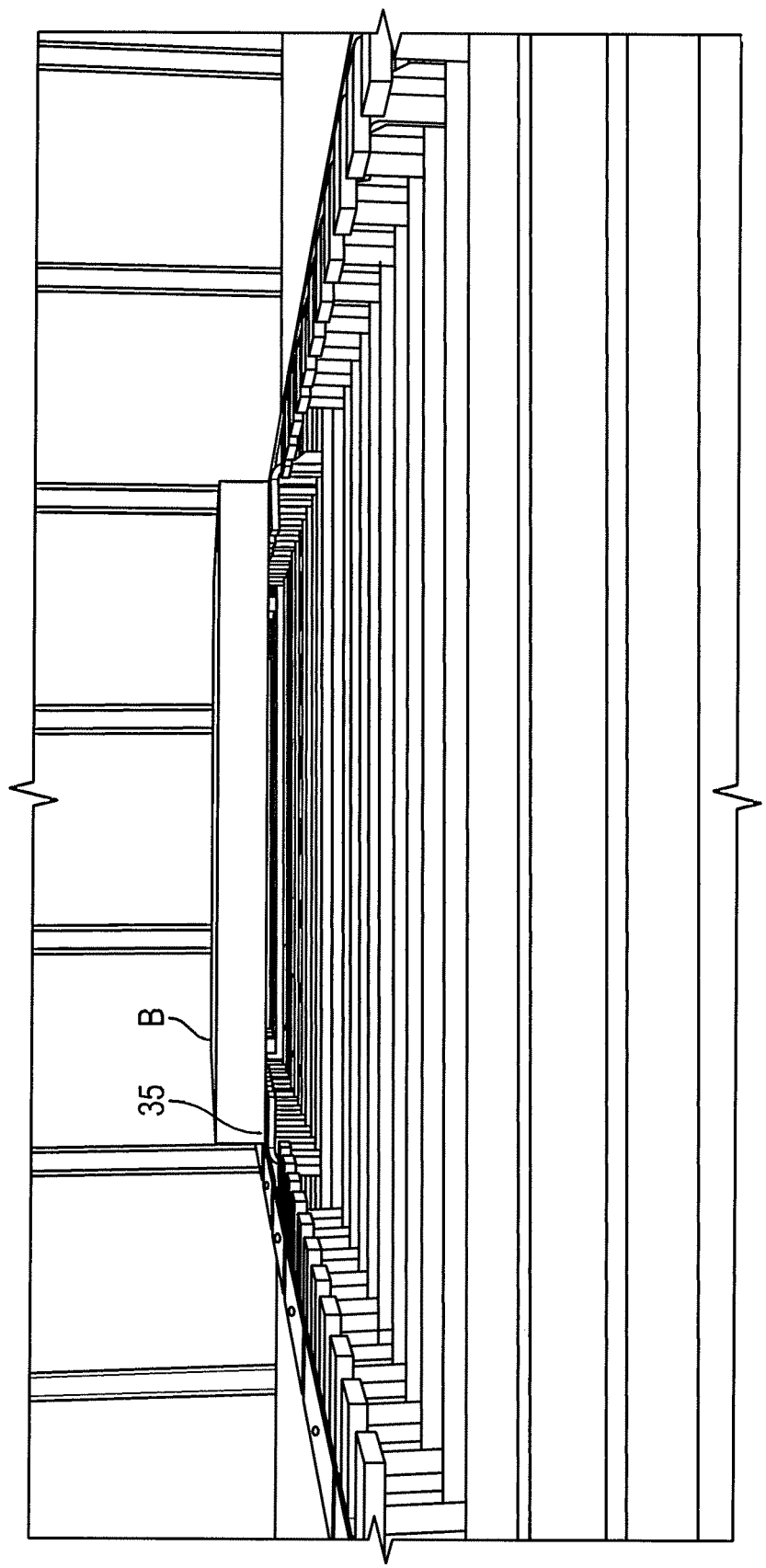
FIG. 12 is a front elevational view of the lift arms holding the stack.
Figure 13:
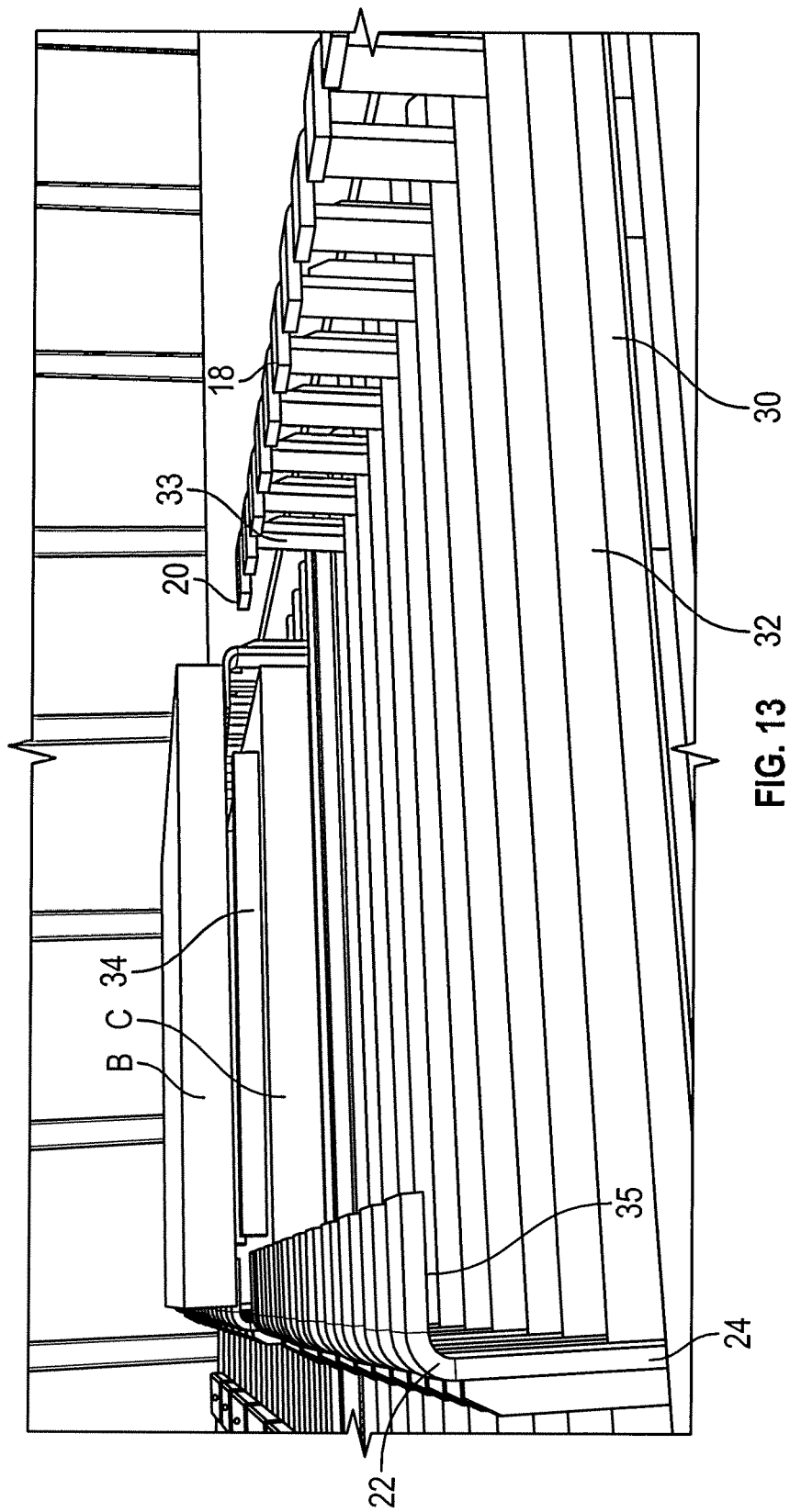
FIG. 13 is a front perspective view of a second stack rolled underneath the first stack on the conveyor rollers.
Figure 14:
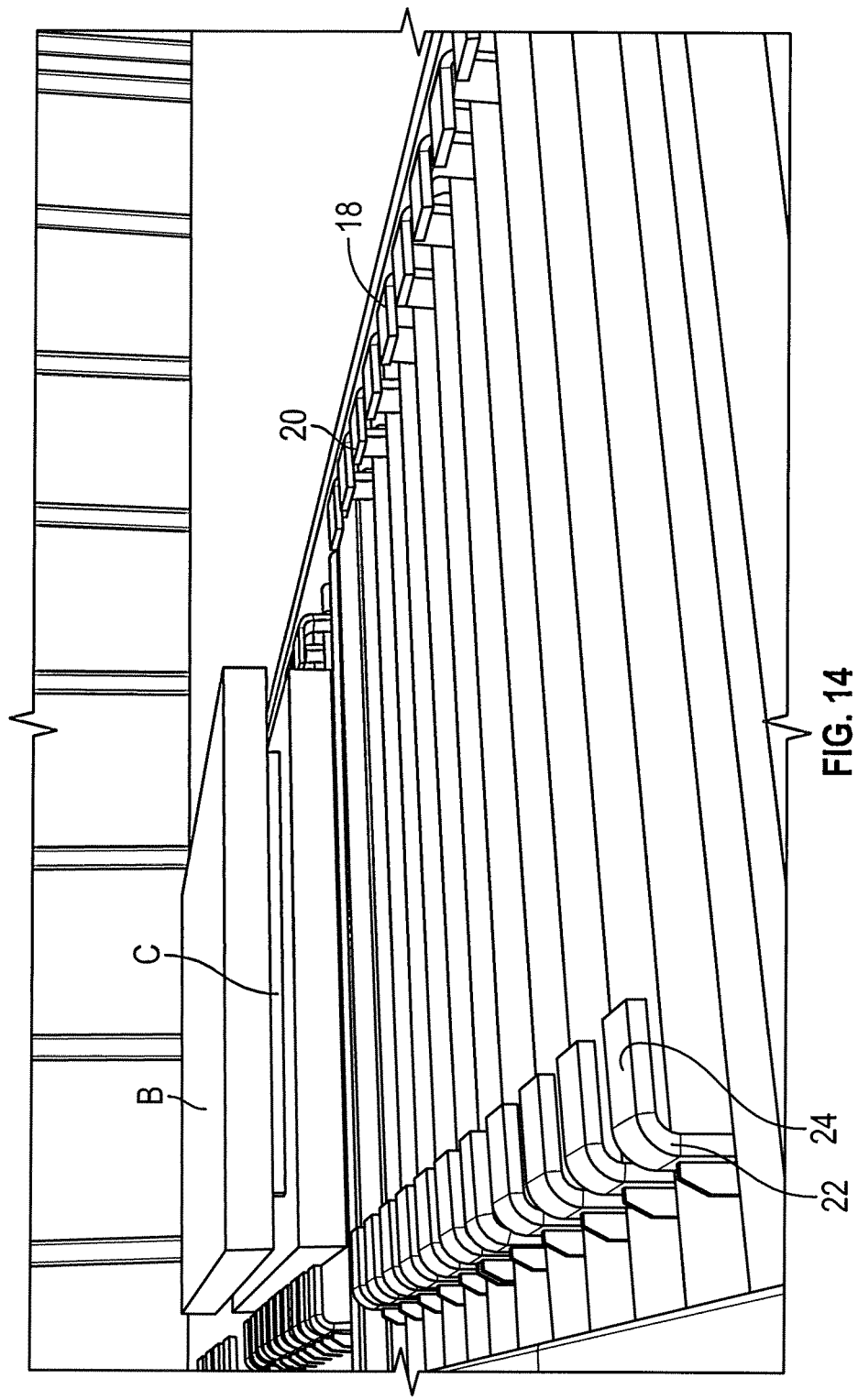
FIG. 14 is a front perspective view of the lift arms moving away from the first stack.
Figure 15:
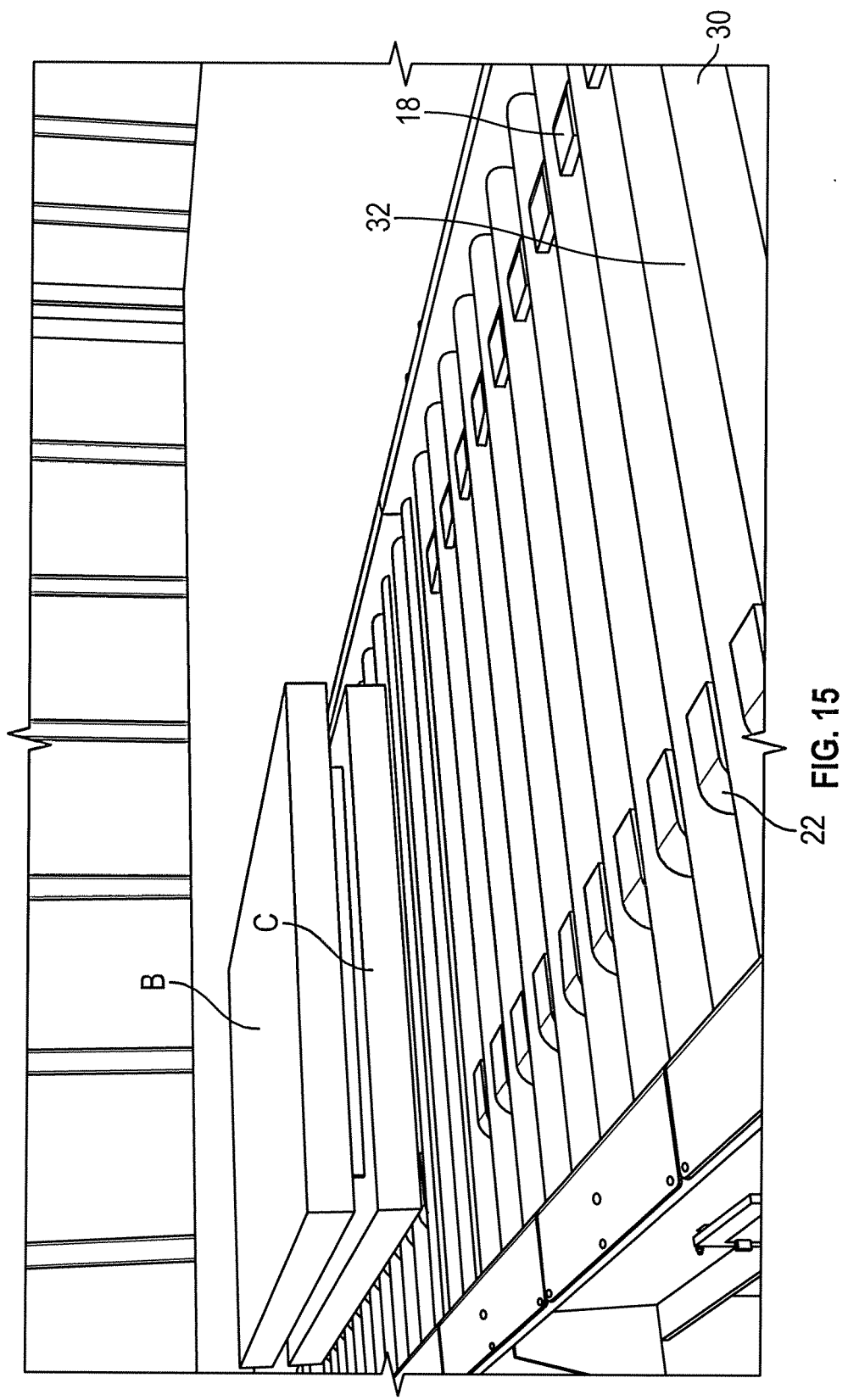
FIG. 15 is a front perspective view of the arms being lowered below the second stack.

Referring to FIGS. 11 and 12, the stack B is raised up by lift arms 18, 22 and supported on horizontal fingers 20, 24. Referring to FIG. 13, once the pack B is raised, another pack C, with spacers 34 (such as a wooden or plastic pieces or "dunnage") positioned on top of the stack C, is rolled into position along the conveyor rollers 32 until aligned with and directly below the first stack B. Alternately, the spacers 34 may be added onto pack C after pack C is placed on the conveyor. The lift arms 18, 22 then lower pack B onto pack C (FIG. 14). Lift arms 18,22 are lowered along with cross beams 10,12. Then the lifting arms 18, 22 are moved away from packs B and C (by traveling with support beams 19,21 along the longitudinal axes of beams 10,12) and then lowered below the conveyor by lowering beams 10,12 (see FIGS. 14 and 15).

Figure 16:
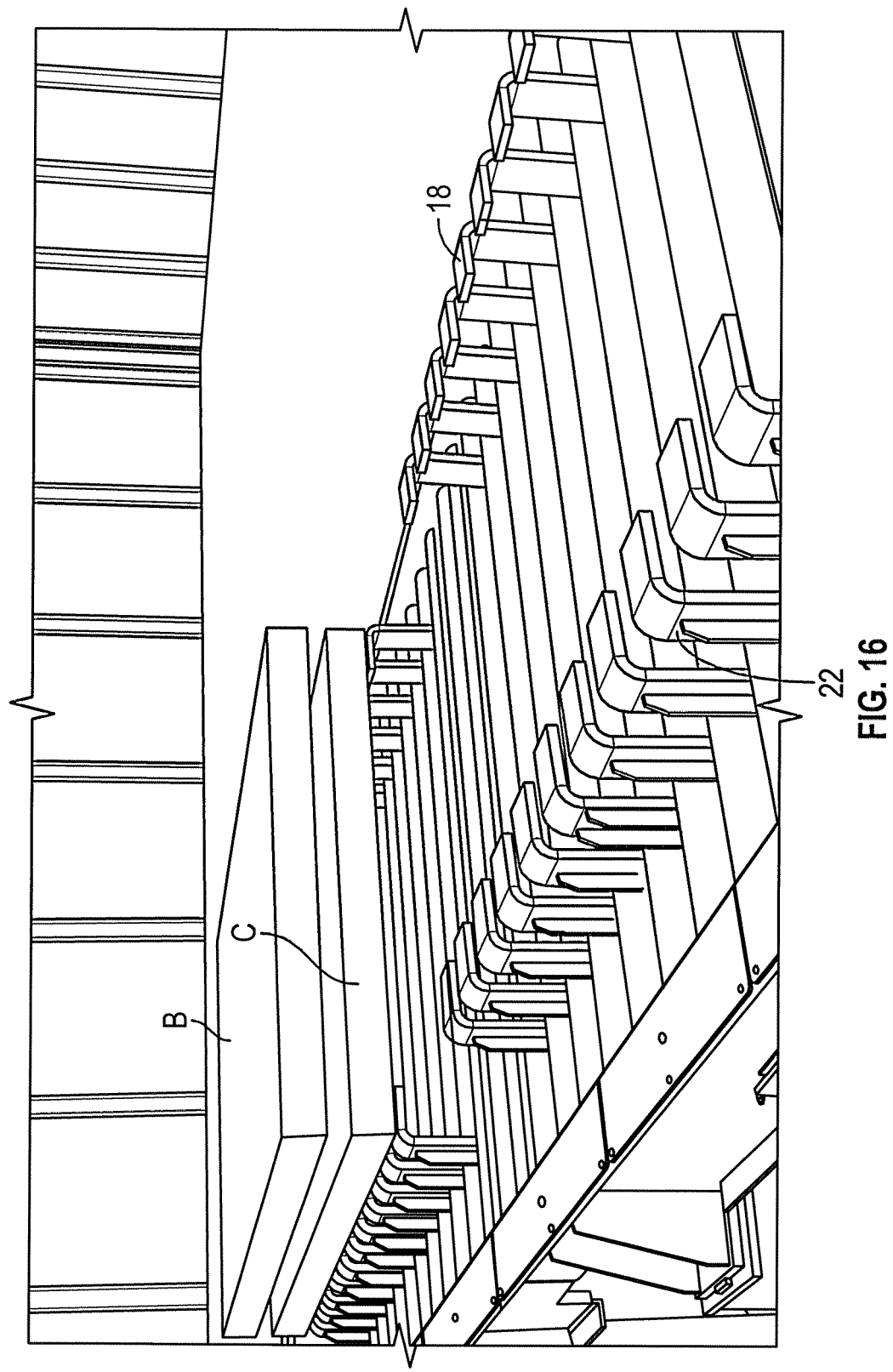
FIG. 16 is a front perspective view of the lift arms raised the second and first stacks.
Figure 17:
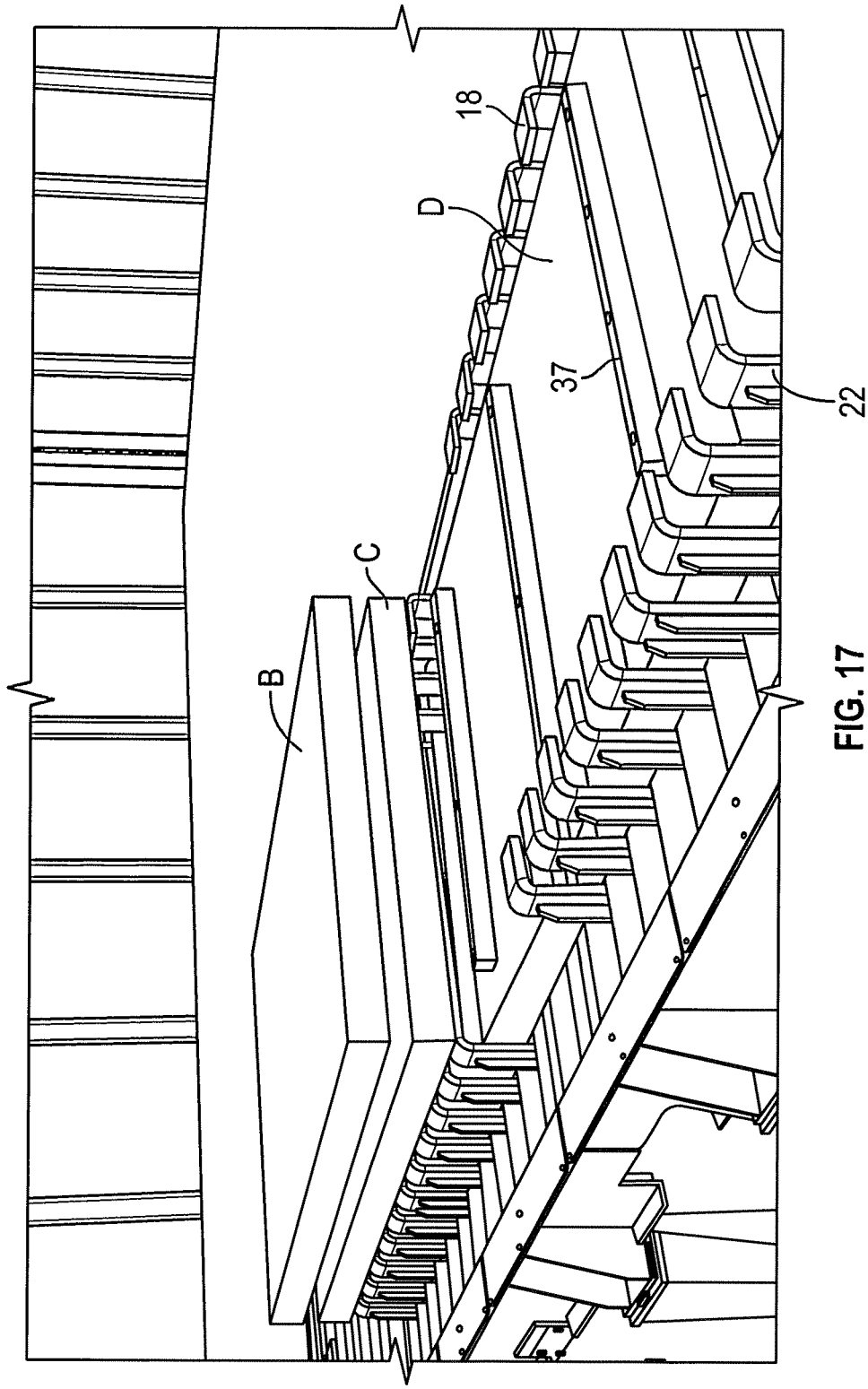
FIG. 17 is a front perspective view of a third stack being rolled with the raised front and second stacks.
Figure 18:
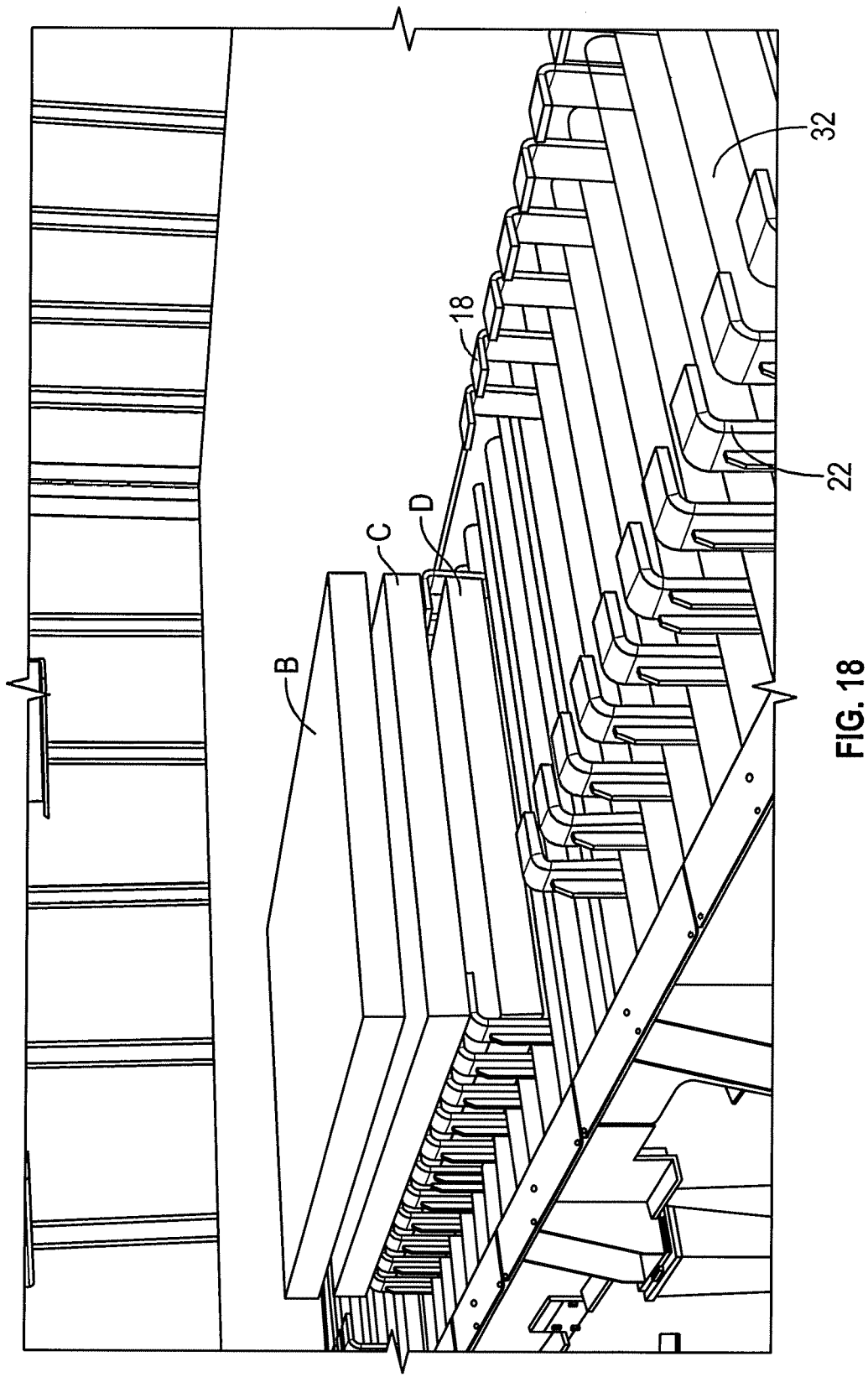
FIG. 18 is a front perspective view showing the third stack position underneath the first and second stacks.

Then, referring to FIG. 16, the lifting arms 18, 22 are moved inwardly, (with support beams 19,21) then raised directly underneath stack C (with beams 10,12) to raise stack C (supported on horizontal fingers 20,24) so another stack D, with spacers "dunnage" 37 attached to a top surface of stack D, can be rolled into position directly under stack C (see FIGS. 17 and 18).

Figure 19:
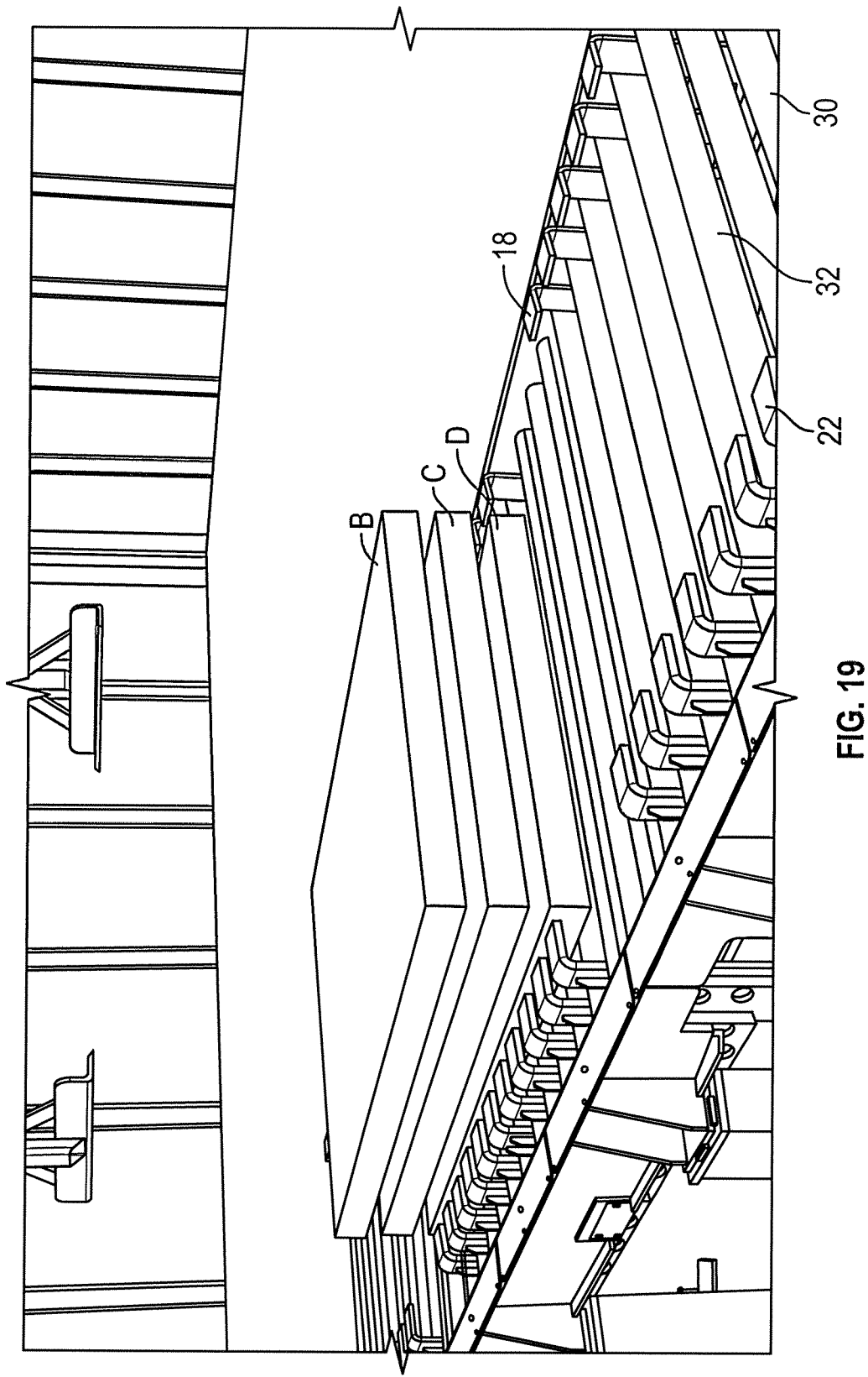
FIG. 19 is a front perspective view showing the lift arms moving away from the stacks.
Figure 20:
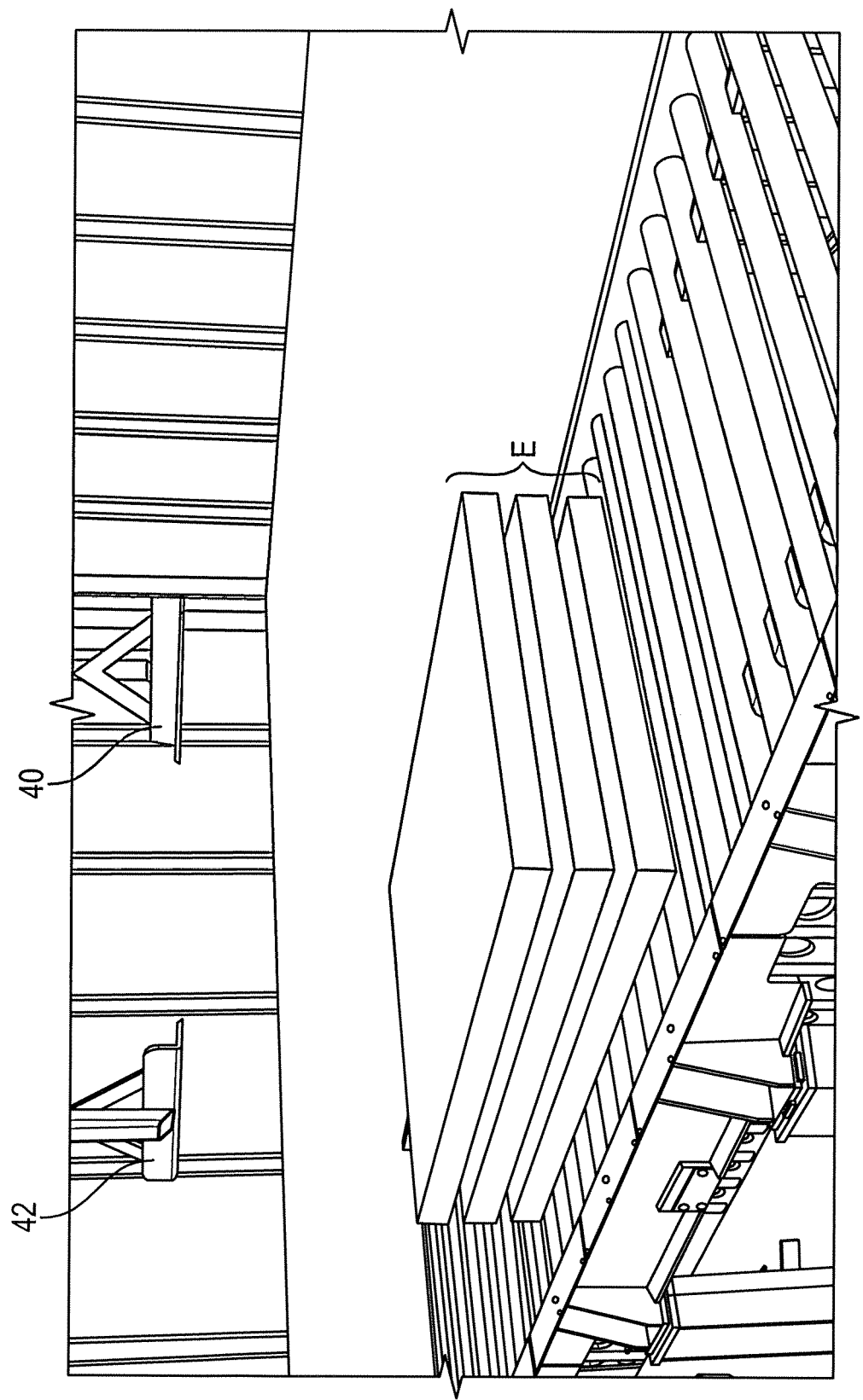
FIG. 20 is a front elevational view of the stacks and a view of lift arms.

The arms 18, 22 are again lowered to place stack C directly onto stack D (FIG. 19). Then the arms 18,22 are again moved outwardly away from stack D on opposite sides of stack D then below conveyor rollers 32 (FIGS. 19 and 20). This process is repeated until a desired "bundle" E is created from stacks B, C and D (see FIG. 21).

The preferred embodiment illustrates three stacks or packs forming a bundle. However, a bundle may be formed by two stacks, four stacks or more, as desired.

Figure 21:
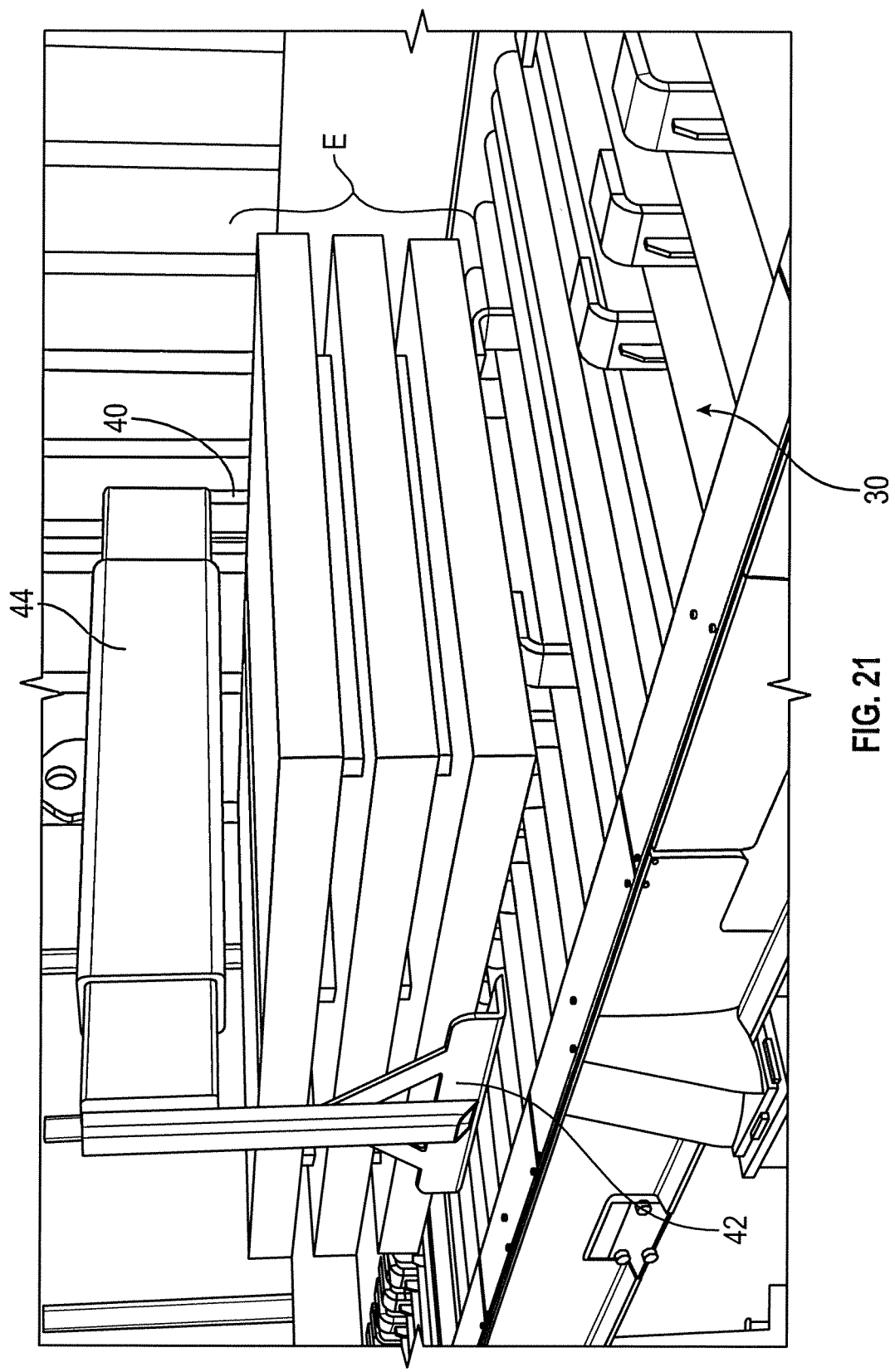
FIG. 21 is a front elevational view of the lift arms engaging the stacks.
Figure 22:
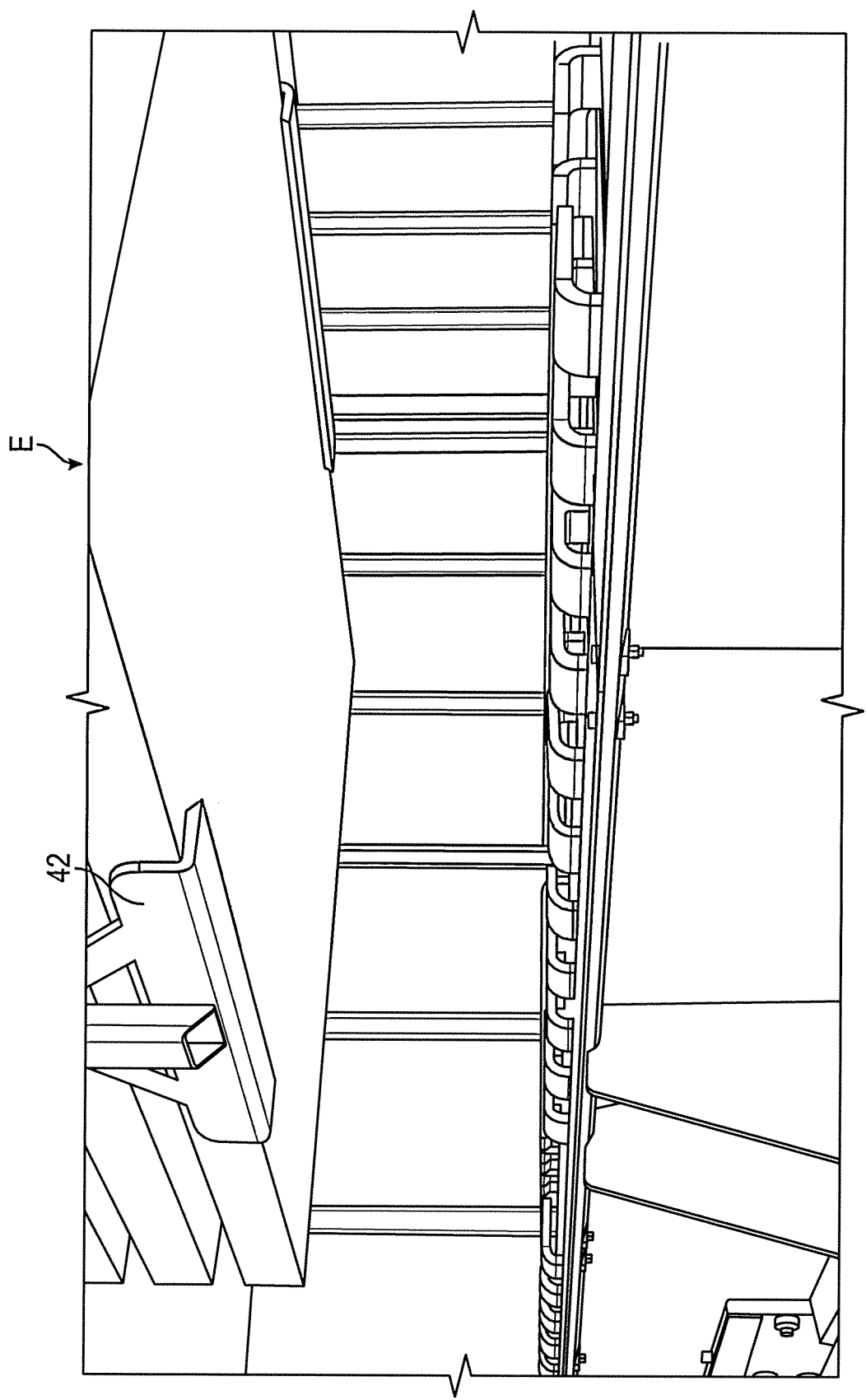
FIG. 22 is a side perspective view showing the lift away raising the stacks from the conveyor.
Figure 23:
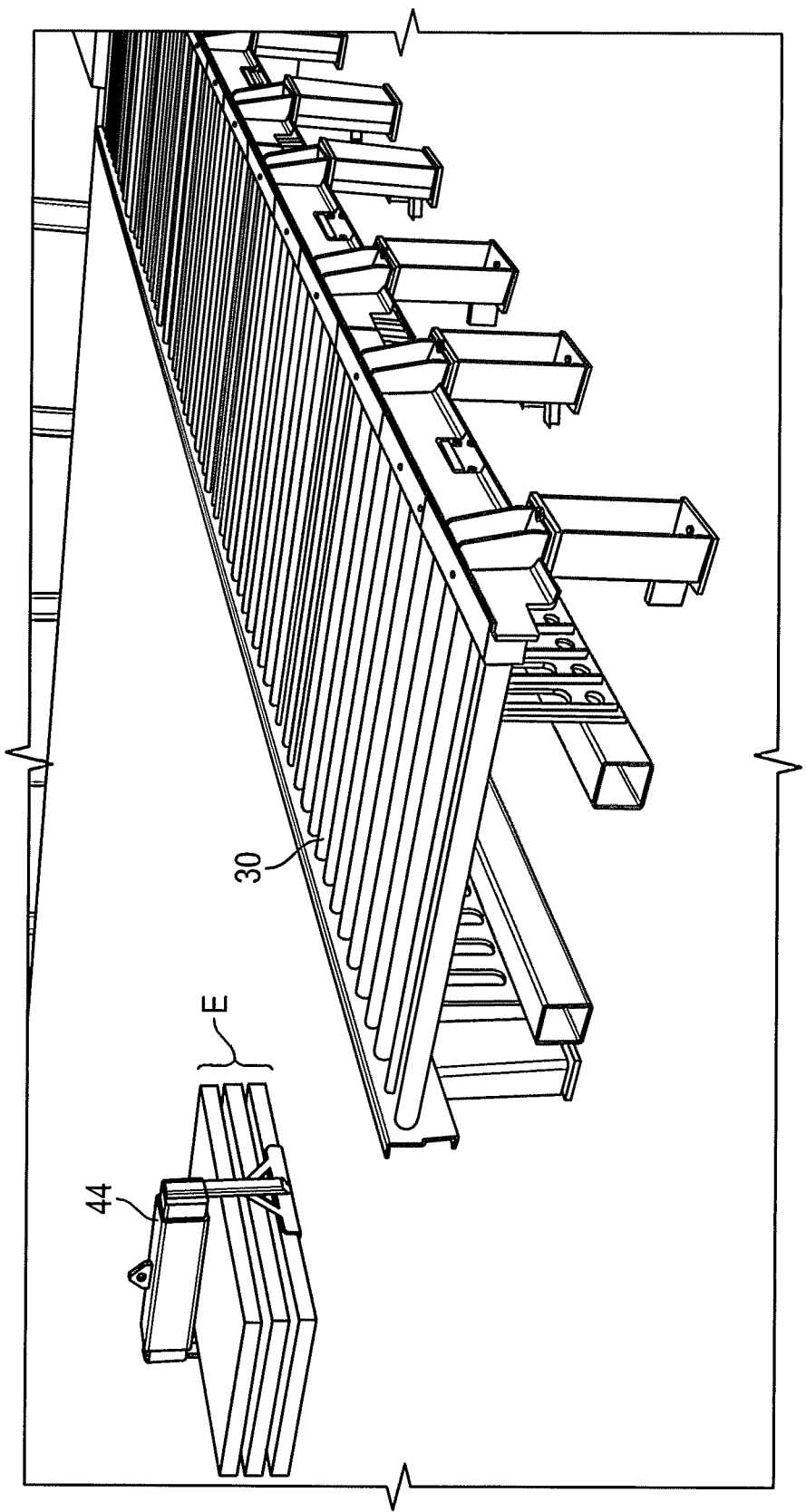
FIG. 23 is a front perspective view of the stacks and lift arms moved away from the conveyor rollers.

Referring now to FIG. 21, the bundle E (including stacks B, C and D) is lifted off of the conveyor via lift arms 40, 42 connected to lift mechanism 44 of which engage the bundle E on opposite sides. Arms 40,42 are moved laterally outward then inward towards each other until in contact with bundle E. Refer to FIGS. 21-23, bundle E is then lifted off of the conveyor 30 via lift mechanism 44 and moved to a desired location and lowered away from the conveyor.

Each pack or stack has a predetermined count or number of pieces or sheets, and spacers, known as "dunnage", are inserted to separate the counted "pack" from subsequent packs that will continue to be dropped on the pack.

Separating stacks of strips or pieces into counted piece packs has been previously accomplished by stopping the line and manually inserting the dunnage, or else the stack can continue to build higher than the required piece count. This large stack can be subsequently separated into counted packs after the stack is run out of the stacker area. Both of these approaches reduce productivity and require manual labor. The present disclosure automates the process.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the detailed description and the appended claims or the equivalent thereof.

The invention claimed is:

1. A bundle builder and lifter assembly, comprising;
a pair of parallel cross beams which are raised and lowered;
an actuator assembly comprising an AC motor and screw jack for actuating said builder and lifter assembly and raising and lowering said pair of parallel cross beams;
a plurality of pairs of lift arms which are moved along a longitudinal axis of the parallel cross beams via said actuator assembly;
said lift arms each comprises a vertical portion and a horizontal portion forming a finger or L-shape member;
a conveyor assembly comprising rollers and positioned above said lift arms and cross beams;
wherein an associated first stack of material is placed on and moved along said rollers of said conveyor assembly;
said lift arms and cross beams are actuated and move to raise said first stack off of conveyor roller assembly by aligning said fingers with said first stack to support and lift said first stack; wherein said plurality of pairs of lift arms extend along a longitudinal axis of support beams connected to and extending between said cross beams.

2. The bundle builder and lift assembly of claim 1, wherein said plurality of pairs of lift arms are lowered below said conveyor assembly and underneath said first stack of material.

3. The bundle builder and lifter assembly of claim 2, wherein said plurality of pairs of lift arms are actuated and raised by said actuator assembly to lift said first stack of material off of said conveyor assembly.

4. The bundle builder and lifter assembly of claim 3, wherein an associated second stack of material is rolled along said conveyor assembly directly below said first stack of material.

5. The bundle builder and lifter assembly of claim 4, wherein said second stack of material comprises at least one spacer located on an upper surface of said second stack of material.

6. The bundle builder and lifter assembly of claim 5, wherein said plurality of pairs of lift arms lower said first stack onto said second stack and then move out of engagement with said first stack.

7. The bundle builder and lifter assembly of claim 6, wherein said plurality of lift arms are positioned underneath said second stack and raise said first stack and said second stack off of said conveyor roller assembly.

8. The bundle builder and lifter assembly of claim 7, wherein an associated third stack of material is rolled along said conveyor roller assembly directly below said first stack and said second stack.

9. The bundle builder and lifter assembly of claim 8, wherein said plurality pairs of lift arms lower said first stack and said second stack onto said third stack and then are moved out of contact with said second stack.

10. The bundle builder and lifter assembly of claim 9, wherein said plurality pairs of lift arms lower said first stack and said second stack onto said third stack and then are moved out of contact with said second stack.

11. The bundle builder and lifter assembly of claim 10, wherein said first stack, said second stack and said third stack form a bundle.

12. The bundle builder and lifter assembly of claim 11, wherein a lift mechanism comprises a pair of lift members which are moved towards each other to engage said bundle, and lift said bundle off of said conveyor roller assembly.

13. A bundle builder and lifter assembly comprising:
a conveyor assembly comprising a plurality of rollers;
a pair of horizontal support members comprising a plurality of lift arms;
a pair of cross beams, wherein said horizontal support members extend between said cross beams;
an actuator for moving and raising and lowering said plurality of lift arms and cross beams and moving said horizontal support members and said plurality of lift arms along a longitudinal axis of said cross beams;
said plurality of lift arms each comprises fingers which engage and raise and lower associated stacks of material which are positioned on said rollers of said conveyor assembly; wherein said plurality of lift arms are lowered below said conveyor assembly and underneath said associated stacks of material;

said stacks of material are stacked together using said lift arms to form a bundle;

and wherein a lift mechanism raises said bundle off of said conveyor assembly.

14. A method forming and lifting a bundle assembly, comprising:

providing a pair of cross beams;

providing a pair of support beams extending between said cross beams;

providing a plurality of lift arms positioned along a length of each of said support beams;

providing an actuator comprising at least one of a motor and screw jack for raising and lowering said cross beams and moving said support beams and said lift arms;

providing a conveyor assembly having rollers;

moving a first stack of material along said rollers;

lowering said lift arms below said conveyor assembly and underneath said first stack and then raising said first stack off of said conveyor via said lift arms;

moving a second stack of material on said rollers to a position below said first stack;

lowering said first stack onto said second stack via said lift arms; and, moving said lift arms out of engagement with said first stack; thereby forming a bundle and using a lift mechanism to lift and remove said bundle off of said conveyor.

* * * * *